United States Patent
Roos et al.

(10) Patent No.: US 12,338,842 B2
(45) Date of Patent: Jun. 24, 2025

(54) VALVE BLOCK BODY AND DEVICE FOR ARRANGING THE VALVE BLOCK BODY ON A DRIVE BODY

(71) Applicant: GEMÜ Gebr. Müller Apparatebau Gmbh & Co. Kommanditgesellschaft, Ingelfingen (DE)

(72) Inventors: Robin Roos, Rotkreuz (CH); Jochen Steigert, Lucerne (CH)

(73) Assignee: GEMÜ Gebr. Müller Apparatebau Gmbh & Co. Kommanditgesellschaft, Ingelfingen (DE)

( * ) Notice: Subject to any disclaimer, the term of this patent is extended or adjusted under 35 U.S.C. 154(b) by 442 days.

(21) Appl. No.: 17/751,247

(22) Filed: May 23, 2022

(65) Prior Publication Data

US 2022/0389942 A1 Dec. 8, 2022

(30) Foreign Application Priority Data

Jun. 7, 2021 (DE) .......................... 102021114567.8

(51) Int. Cl.
*F15B 13/08* (2006.01)
*F16K 11/22* (2006.01)
*F16K 27/00* (2006.01)

(52) U.S. Cl.
CPC .......... *F15B 13/0825* (2013.01); *F16K 11/22* (2013.01); *F16K 27/003* (2013.01)

(58) Field of Classification Search
CPC .... F16K 11/22; F16K 27/003; F15B 13/0814; F15B 13/0825
See application file for complete search history.

(56) References Cited

U.S. PATENT DOCUMENTS

| 5,139,225 | A | 8/1992 | Olson et al. |
| 6,155,287 | A * | 12/2000 | Matarai ............... F15B 13/0814 |
| | | | 251/114 |
| 7,399,361 | B2 * | 7/2008 | de Leeuw ................. B05C 5/02 |
| | | | 118/410 |
| 2002/0043288 | A1 | 4/2002 | Seitz et al. |
| 2004/0124251 | A1 | 7/2004 | Gressett, Jr. et al. |
| 2017/0274408 | A1 | 9/2017 | Aguilar et al. |
| 2018/0274689 | A1 | 9/2018 | Gagne et al. |

FOREIGN PATENT DOCUMENTS

DE 102013104688 A1 11/2013

OTHER PUBLICATIONS

DE102021114567.8, Search Report (Feb. 2, 2022), 7 Pages.
EP Serial No. 22161745.9. Examination Report (Sep. 1, 2022).

* cited by examiner

*Primary Examiner* — Michael R Reid
(74) *Attorney, Agent, or Firm* — Jessica Smith; LOZA & LOZA, LLP

(57) ABSTRACT

A valve block body for arranging on a drive mount includes multiple process fluid ducts, between which valve seats are arranged. Multiple drive connection sections are assigned to the valve seats, which are arranged on at least one side of the valve block body. Multiple clamping sections are arranged facing away from at least one side of the valve block body.

10 Claims, 10 Drawing Sheets

VALVE BLOCK BODY AND DEVICE FOR ARRANGING THE VALVE BLOCK BODY ON A DRIVE BODY

CROSS REFERENCE TO RELATED APPLICATIONS

The present application claims priority under 35 U.S.C. § 119(a) to German National Patent Application No. 10 2021 114 567.8 filed on Jun. 7, 2021, and entitled, "VALVE BLOCK BODY AND DEVICE FOR ARRANGING THE VALVE BLOCK BODY ON A DRIVE BODY," which is hereby expressly incorporated by reference herein.

FIELD

The invention is related to advances in the area of a valve block body, particularly for single-use.

BACKGROUND

The problems of the state of the art are resolved by a valve block body according to claim 1 and a device according to a separate claim.

SUMMARY

A first aspect of the description concerns a valve block body for arranging it on a drive mount. The valve block body comprises multiple process fluid ducts, between which valve seats are arranged; multiple drive connection sections, which are arranged on at least one side of the valve block body; and multiple clamping sections, which are arranged facing away from at least one side of the valve block body.

It is advantageous that this valve body is suitable for being coupled and decoupled with a drive mount quickly and safely, and thus faultlessly. The fault-free locking of single-use valve bodies with the drives is thus enabled hereby. In this way, a reuse of drives is possible in the single-use scope. Compared to other systems comprising multiple separate valve units such as, e.g., tubing pinch valves, costs and the construction space required are reduced.

An advantageous example is characterized in that multiple form-fit sections running parallel to an mounting axis, are provided.

The form-fit sections define the arrangement of the valve block body on the drive mount advantageously. Especially, the drive connection sections are positioned precisely to the drive by the form-fit sections.

An advantageous example is characterized in that the mounting axis runs perpendicular to at least one surface of at least one side of the valve block body, especially perpendicular to at least one of the drive connection sections, especially perpendicular to a conceived plane via a margin of at least one drive connection section.

The positioning of the drive mount and the valve block body with respect to each other is improved by this axial guide of the valve block body.

An advantageous example is characterized in that at least one of the drive connection sections comprises a diaphragm, which is connected with the valve block body in its lateral area, at least in sections.

Thus, there is a type of pre-connection of the diaphragm with the valve block body and simplifies installation, as a separate positioning of multiple diaphragms is omitted. Incorrect installations of the diaphragm are thereby reduced.

An advantageous example is characterized in that at least one coupling section protrudes from the diaphragm, especially parallel to the mounting axis.

Especially if the coupling section protrudes parallel to the mounting axis, advantages arise with the detachable connection of the diaphragm with the drive.

A second aspect of the description is oriented to a device for arranging the valve block body on the drive mount. The device comprises the valve block body according to the first aspect. Further, the device comprises the drive mount, on which the multiple valve drives are arranged, wherein in a first state, multiple movable clamping elements which are supported by the drive mount, create an installation space for arranging the valve block body on the drive mount, and wherein in a second state, the multiple clamping elements engage the assigned clamping sections of the valve body and clamp the valve block body between the multiple clamping elements and the drive mount.

The device improves installation and deinstallation, as well as the coupling accuracy between the valve block body and the drive mount.

An advantageous example is also characterized in that multiple form-fit elements protrude from the drive mount, that multiple form-fit elements limit the installation space for the valve block body at least in sections in the first state, and that the multiple form-fit elements in the second state engage in the form-fit sections of the valve block body.

The freedom of movement of the valve block body and the drive mount are limited by the positive lock advantageously, which improves the positioning of both components with respect to each other and thus improves the positioning accuracy of the drive connection sections to the drives.

An advantageous example is characterized in, that in the first state, the multiple clamping elements lie at least in an area facing the valve body within a conceived extension of the assigned form-fit element running parallel to the mounting axis.

Thus, a compact device can be provided advantageously. Simultaneously, in the first state, the feed in the installation space for arranging the valve block body is enabled.

An advantageous example is characterized in that the device comprises at least one manual, pneumatic or motorized clamping drive for moving at least one or more clamping elements, wherein the clamping drive is supported by the drive mount.

A planned movement of the clamping elements is achieved and a repeatable clamping of the valve block body can be carried out advantageously, with the help of the drive and a gearbox arranged between the drive and the clamping elements.

An advantageous example is characterized in that the multiple clamping elements are coupled with each other via a common control beam, and that at least one clamping drive induces its drive torque into the control beam.

The clamping sections can be moved simultaneously via the control beam advantageously. Furthermore, the number of clamping drives can be reduced.

An advantageous example is characterized in that the drive mount is arranged between the control beam on one side and the at least one clamping drive and the clamping elements on the other side.

Especially in a manual drive, the installation of the valve block body is easier for the fitter to check, as the operation and tension take place on the side of the installation space of the drive mount.

An advantageous example is characterized in that an actuating rod positioned movably along its longitudinal axis is connected with the multiple assigned clamping elements via a swivel joint, wherein an element fixed to the drive mount engages in an elongated hole of the assigned clamping element.

Thus, a compact clamping element is provided, which in the first state, creates the holding space for arranging the valve block body. In the second state, the clamping force is initiated into the valve block body by a tensile force brought into the actuating rod.

An advantageous example is characterized in that the elongated hole tapers in the direction of a contact section of the assigned clamping element, which is arranged for engaging in the assigned clamping section of the valve block body.

The respective clamping element can be transferred from the first state to the second state advantageously. Especially, the widening of the elongated hole pointing away from the contact section enables a compact arrangement in the first state, on the one hand. On the other hand, the widening or tapering forces the clamping element into the titling movement.

An advantageous example is characterized in that a respective adapter of multiple valve drives fixed with a valve rod that can be moved along an actuation axis, creates an installation space for arranging an assigned coupling section, especially a diaphragm, in the first state and wherein the respective adapter defines the assigned coupling section to the drive rod after achieving the second state.

The adapters enable an easy arrangement of the valve block body. An advantageous example is characterized in that each of the valve drives comprise: an intermediate body with control sections, which are fixed within a through-opening of the intermediate body; and the adapter arranged such that it can be moved at least in sections within the through-opening with two adapter elements, which are fixed pivotably with the adapter at a rotation axis running perpendicular to the actuation axis, wherein a respective contact section of the respective adapter element contacts, in a first position of the adapter on the actuation axis, which is taken in the first state, the assigned control section in such a way that the respective adapter element is rotated at the rotation axis in an installation position, in which connection contours of the adapter elements limit an installation space, which is bigger than a holding space, wherein the connection contours of the adapter elements facing the actuation axis limit, in a second position of the adapter, which is taken after achieving the second state, the common holding space for holding and fixing the coupling section to the assigned valve rod to the actuation axis.

The coupling section of the respective valve diaphragm is advantageously defined by simple displacing i.e., moving of the valve rod. This means that a simple control of the valve drives is sufficient and further steps to be carried out manually for fixing the coupling section are omitted.

BRIEF DESCRIPTION OF THE DRAWINGS

Further features, aspects and advantages of the embodiments are given in the following detailed description with reference to the drawings in which.

DETAILED DESCRIPTION

Figure 1:
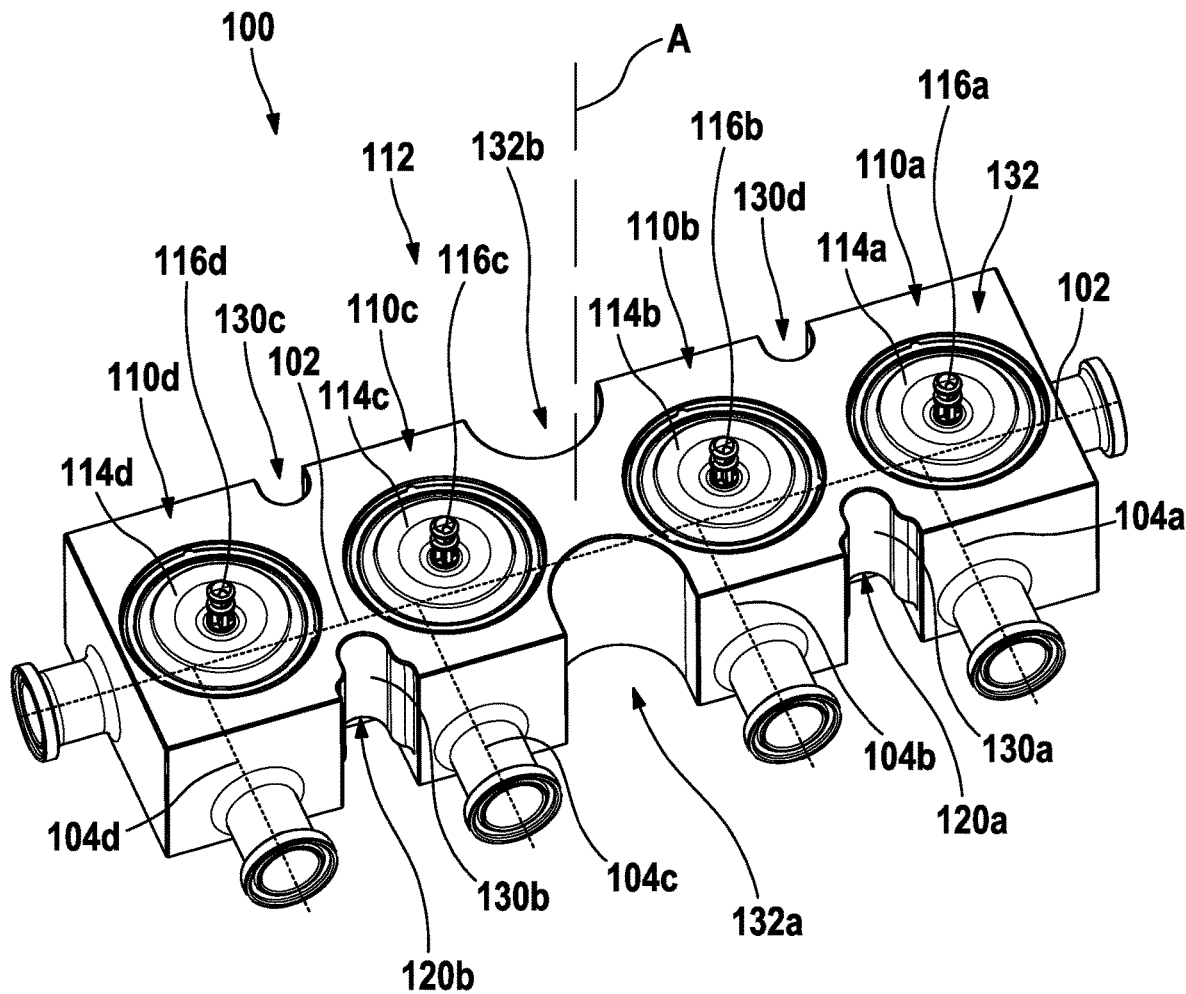
FIG. 1 depicts a perspective view of an embodiment of an exemplary valve block body.
Figure 5:
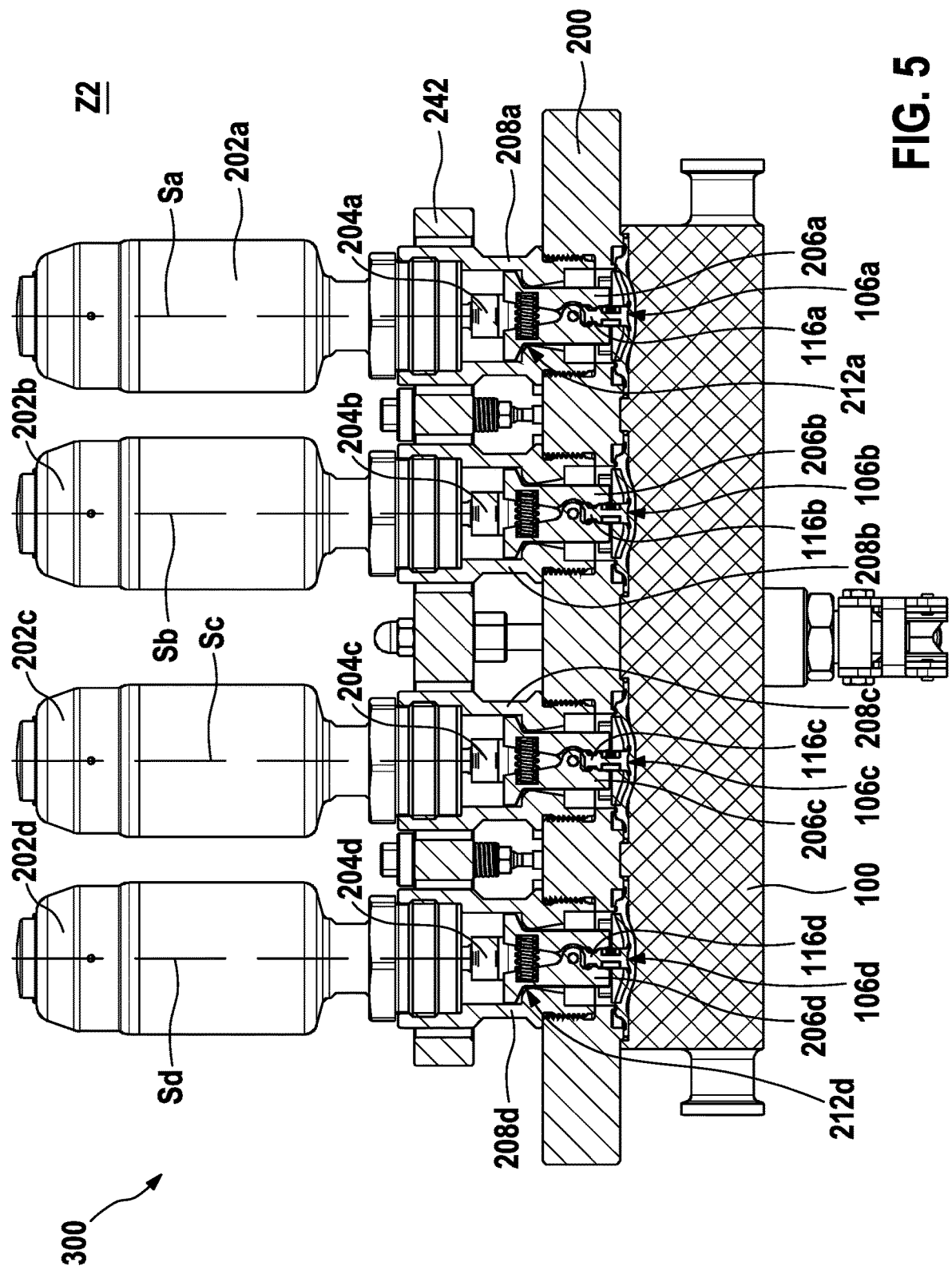
FIG. 5 depicts an embodiment of the device in a longitudinal cross section.

FIG. 1 shows a single-part plastic valve block body 100 in a perspectival view. It is designed for arranging on a drive mount. Multiple process fluid ducts 102, 104a-d are arranged within the valve block body 100, between which valve seats 106a-d shown in FIG. 5 are arranged. At least one part of the process fluid ducts 102, 104a-d ends in outer connections.

Multiple drive connection sections 110a-d assigned to the valve seats 106a-d are arranged on at least one side 112 of the valve block body 100. The drive connection sections 110a-d comprise a respective diaphragm 114a-d, which is connected with the valve block body 100 in its lateral area, at least in sections. For example, the respective diaphragm 114a-d is welded in the lateral area with the valve block body 100 and thus covers the assigned valve seat 106a-d. A respective coupling section 116a-d, for example, in the form of a diaphragm pin, protrudes, especially parallel to the mounting axis A, outwards from the diaphragm 114a-d.

Multiple clamping sections 120a-d are arranged facing away from at least one side 112 of the valve block body 100 and comprise surfaces herein, which point away from the side 112.

Multiple form-fit sections 130a-d running parallel to an mounting axis A are designed as lateral recesses. In non-illustrated form, form-fit sections are not arranged laterally, but instead, they are arranged inside the valve block body 100. As presented here, the form-fit sections 130a-d are arranged laterally on the valve block body 100 and follow an outer cylinder surface in a proximal area. Further lateral recesses 132a-b include elements from the clamping drives 240a-b, at least partially without direct contact, which reduces the installation space of the device 300.

The mounting axis A runs perpendicular to at least one surface 132 on at least one side of the valve block body 100, particularly perpendicular to at least one of the drive connection sections 110a-d, especially perpendicular to a conceived plane through a margin of at least of one of the drive connection sections 110a-d.

The valve block body 100 is produced, for example, from PP (polypropylene), PE (polyethylene), PSU (polysulfone), PEEK (polyether ether ketone). The diaphragms 114a-d are produced, for example, from a TPE (thermoplastic elastomer), EPDM (ethylene-propylene-diene-M class rubber), NBR (acrylnitrile-butadiene-rubber) or silicone.

Figure 2A:
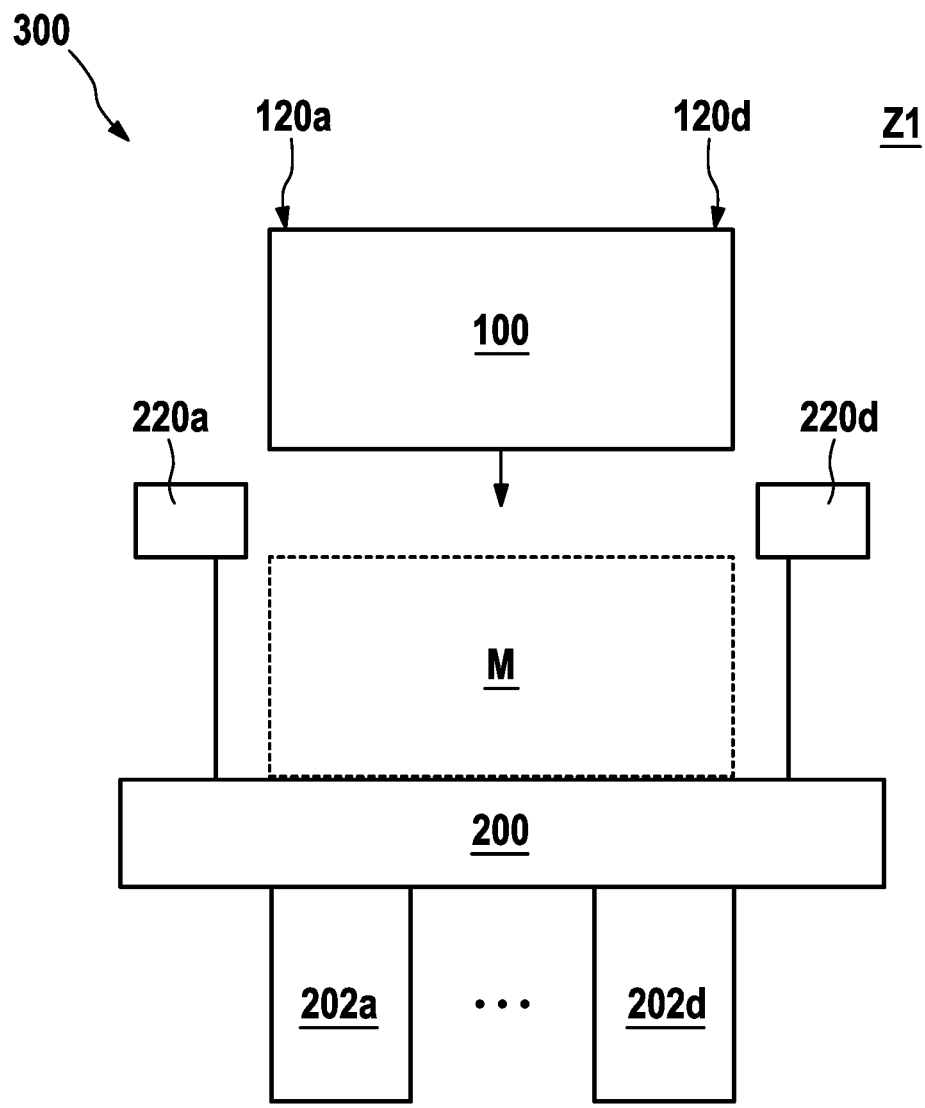
FIGS. 2A and 2B depict in a schematic cross sectional view, an embodiment of a device for arranging a valve block body on a drive mount in a respective state.
Figure 2B:
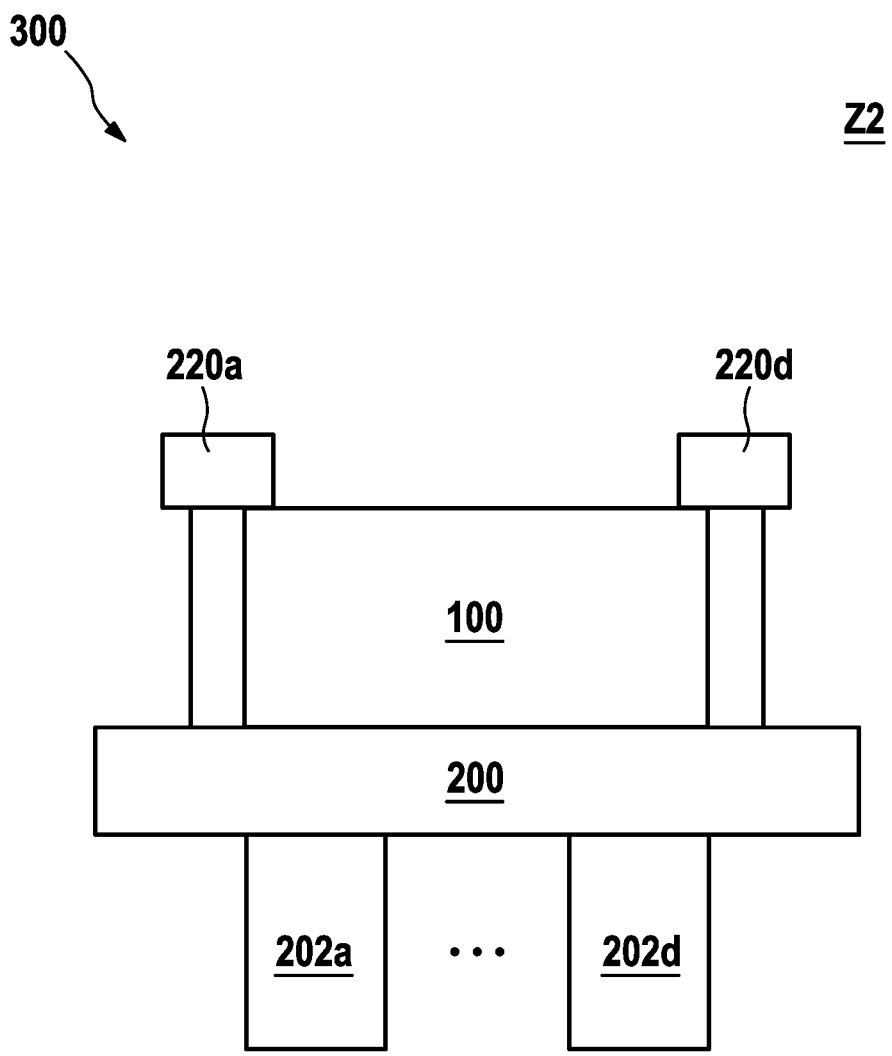

FIGS. 2A and 2B show, in a schematic cross sectional view, a device 300 for arranging the valve block body 100 on the drive mount 200 in a respective state. Multiple valve drives 202a-d are arranged on a side facing away from the valve block body 100 on the drive mount 200, in particular, they are fixed rigidly.

In the first state Z1 shown in FIG. 2A, multiple clamping elements 220a-d which are movable and supported by the drive mount 200, create an installation space M for arranging the valve block body 100 on the drive mount 200.

In the second state Z2 shown in FIG. 2B, the multiple clamping elements 220a-d engage in the assigned clamping sections 120a-d of the valve body 100 and clamp or brace the valve block body 100 between the multiple clamping elements 220a-d and the drive mount 200.

The clamping elements 220a-d are transferred via one or more clamping drives in a respective clamping position according to the second state. After ending the use of the valve block body 100, the device 300 is brought back to the state Z1 and the valve body 100 can be replaced.

Figure 3A:
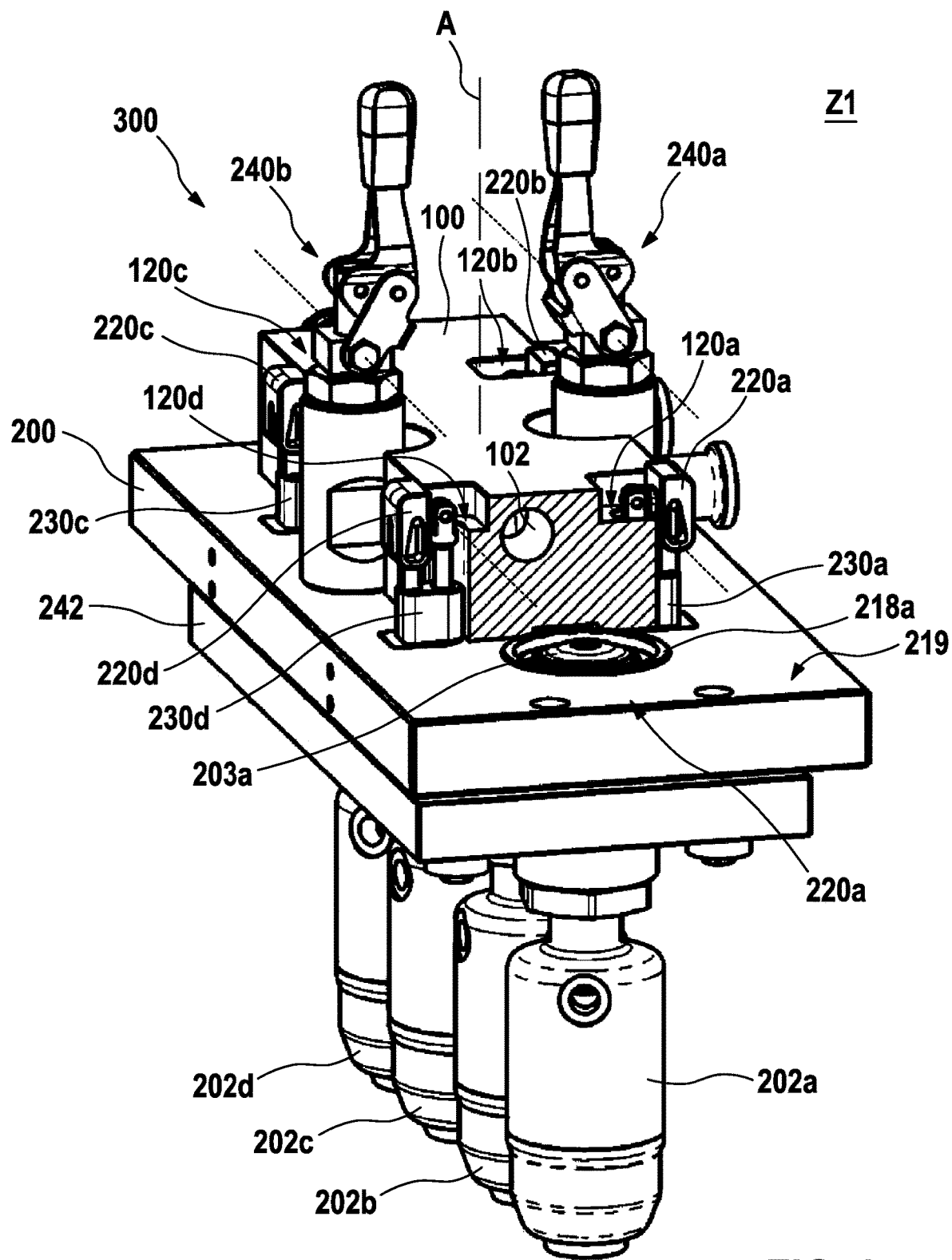
FIGS. 3A and 3B depict in a perspectival view, an embodiment of the device in the respective state.
Figure 3B:
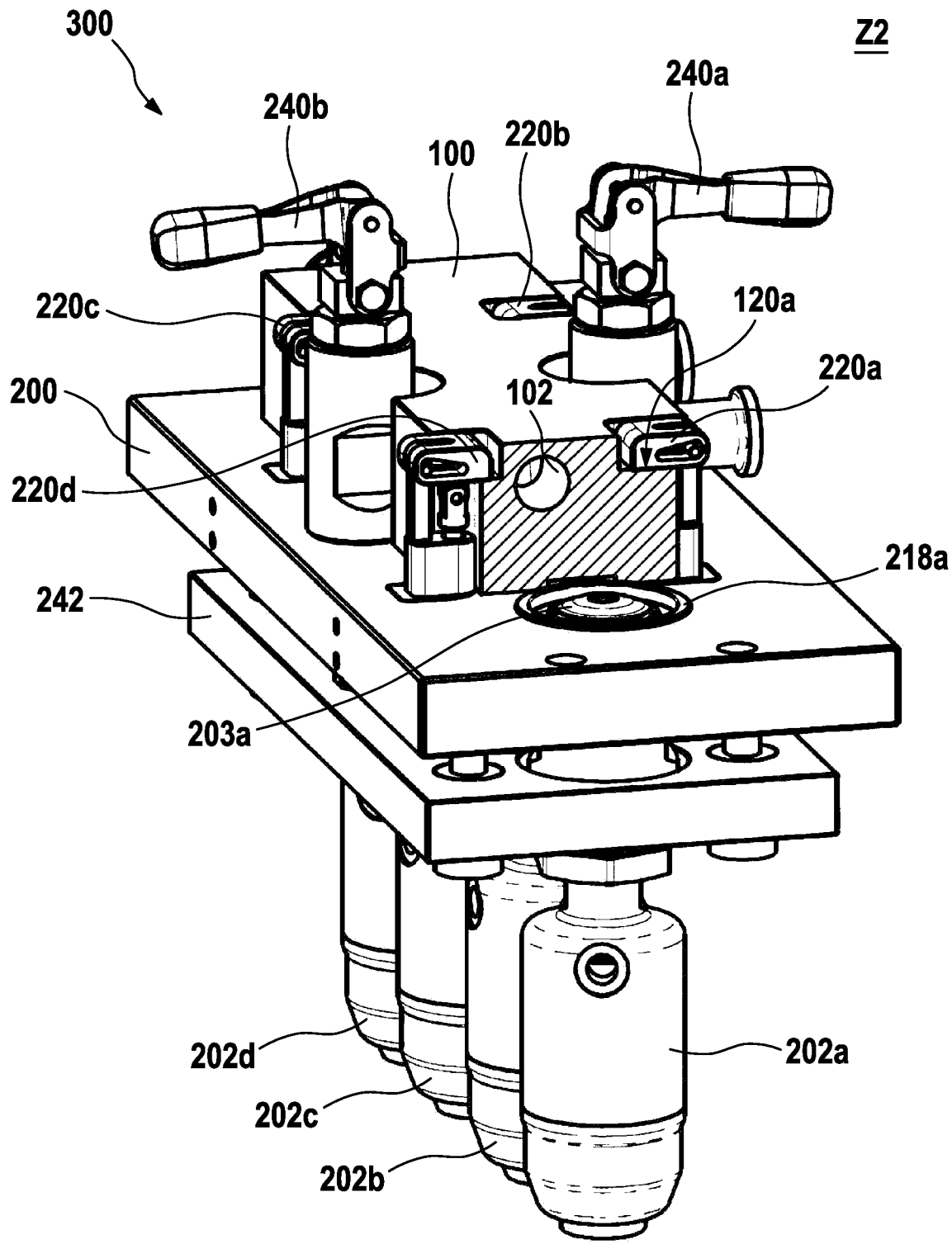

FIGS. 3A and 3B show, in a perspective view, the device in each of the respective states Z1, Z2. Multiple form-fit elements 230a-d protrude from the drive mount 200. The form-fit elements 230a-d limit, in the first state Z1, the installation space M from FIG. 2A for the valve block body 100, at least in sections. The form-fit elements 230a-d engage in the second State Z2, in the form-fit sections 130a-d of the valve block body 100 and fix it at least in a plane perpendicular to the axis A. The multiple form-fit elements 230a-d or their surfaces run, at least in sections, parallel to the mounting axis A of the valve block body 100, wherein the form-fit elements 230a-d interlocks, in the second state, fix the valve block body 100 perpendicular to the mounting axis A positively.

Figure 4A:
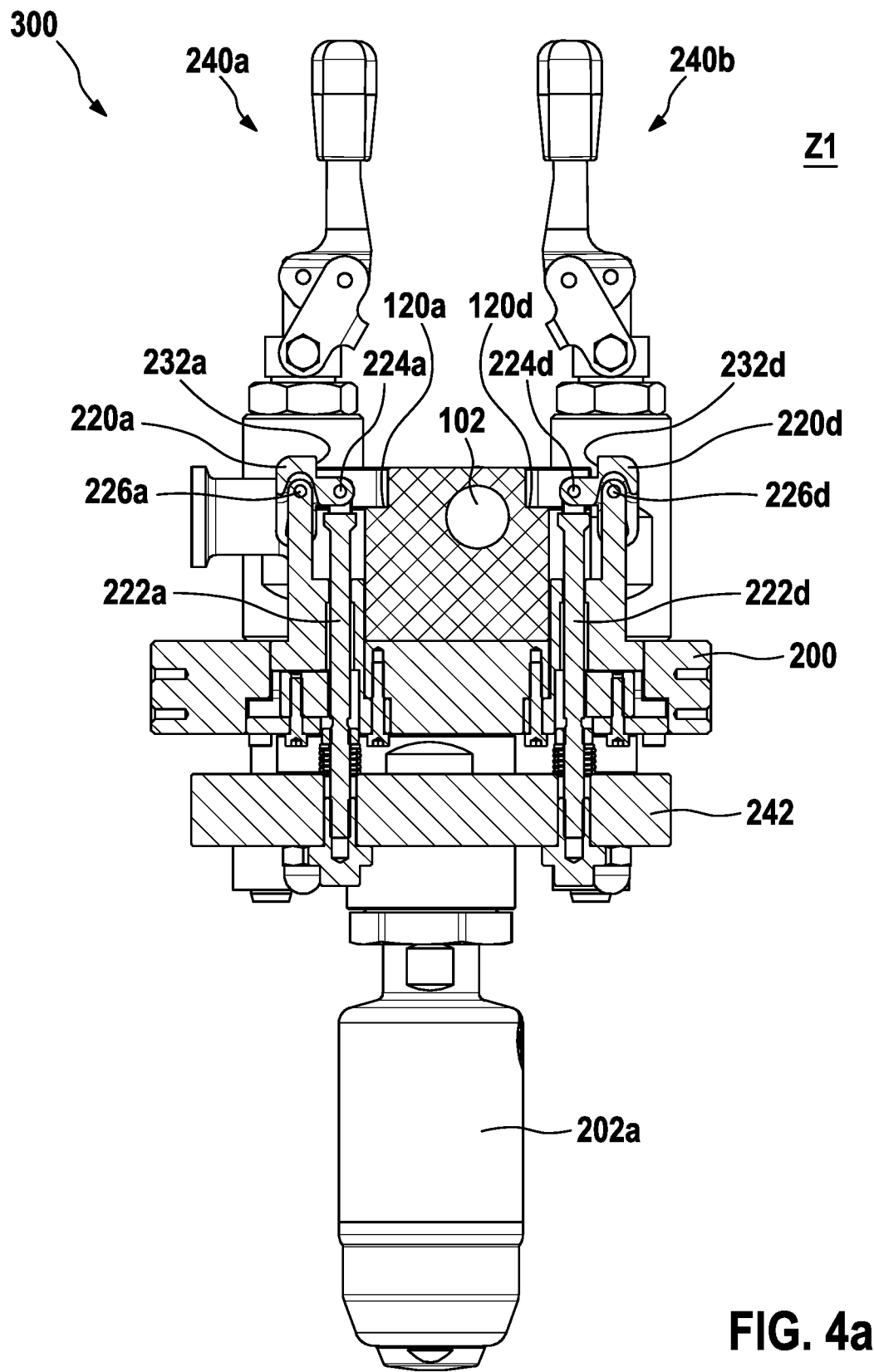
FIGS. 4A and 4B depict in a cross sectional view, an embodiment of the device in the respective state.

In the first state Z1 according to FIGS. 2A, 3A and 4A, multiple clamping elements 220a-d respectively lie at least in one area facing the valve body 100 within a conceived extension of the assigned form-fit element 230a-d running parallel to the mounting axis A. When transiting to the second state Z2, on the contrary, the clamping elements 220a-d protrude from the above-mentioned extension.

The manual clamping drives 240a-b are used for moving the clamping elements 220a-d, wherein the clamping drive 240a-b is supported by the drive mount 200. The clamping elements 220a-d are coupled with each other via a common control beam 242. The manual clamping drives 240a-b are rotated by the worker with a respective handling at an axis, with which the drive torque is induced in the control beam 242. Of course, the manual clamping drives 240a-b can also be replaced by one or more electrical or pneumatic drives and arranged in a different position.

The drive mount 200 is arranged between the control beam 242 on one side of the drive mount 200 and at least one clamping drive 240a-b as well as the clamping elements 220a-d on the other side of the drive mount 200. The control beam 242 is positioned via guide sections for a movement along or parallel to the axis A at the drive mount 200.

The drive mount 200 comprises multiple coupling sections for coupling with the drive connection sections 110a-d. The respective coupling sections, therefore, comprise a through-opening for feeding through the drive components such as for example, a pressure piece 203a-d. A seal section 218a-d is raised against a surrounding surface 219 of the drive mount 200, in order to produce a deadlock or tensioning of the peripheral region of the respective diaphragm 114a-a between the valve block body 100 and the drive mount 200 in the second state Z2.

Figure 4B:
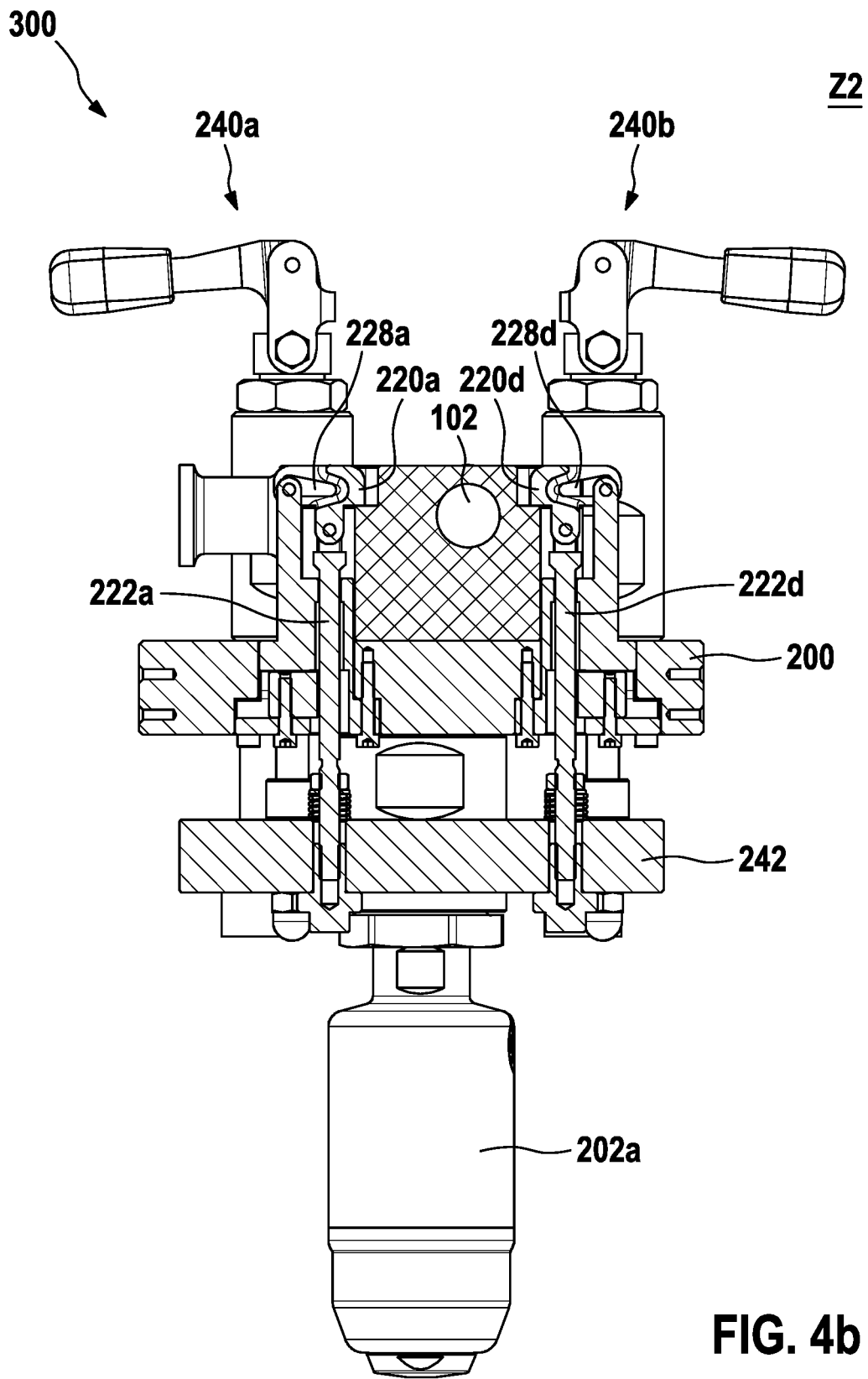

FIGS. 4A and 4B show, in a cross sectional view, the device 300 in each of the states Z1 and Z2. An actuating rod 222a-d positioned movably along its longitudinal axis is fixed with control beam 242. The actuating rod 222a-d is connected via a swivel joint 224a-d with the assigned multiple clamping elements 220a-d. An element 226a-d arranged in a fixed way at the drive mount 200 protrudes in an elongated hole 228a-d of the assigned clamping element 220a-d. Thus, the clamping element 220a-d designed as bracket is tilted via an axial stroke parallel to the mounting axis A, as it is positively driven in a contour of the elongated hole 228a-d and tilts at an eccentric bearing point according to the element 226a-d fixed to the drive mount 200. After tilting, a clamping force is exercised on the multi-valve block 100 by the remaining axial stroke of the actuating rod 222a-d. A connection is established between the drive mount 200 and the valve block body 100 with the brackets. The clamping force brought in presses the valve block body 100 on the drive mount 200 and thus presses the peripheral areas of the diaphragms 114a-d of the valve block body 100 towards the assigned sealing ring or the assigned sealing section 218a-d of the drive mount 200. The actuating rods 222a-d of the brackets or clamping elements 220a-d are moved axially by an axial displacement of the control beam 242. The control beam 242 can either be operated via the push rod clamp or with suitable slider contour even via a pneumatic or electric clamping drive 240a-b.

The elongated hole 228a-d tapers in the direction of a contact section 232a-d of the assigned clamping element 220a-d. The contact section 232a-d is configured for engaging in or for contacting the assigned clamping section 120a-d of the valve block body 100 and is designed here via an even surface. Other embodiments can, of course, also be conceived. Thus, an actuation of the assigned clamping element 220a-d can also be conceived with an additional rocker arm 10.

For optimization of the manufacturing costs and simplification of the functionality, the brackets can be designed, for example, also without elongated hole for the purpose of the clamping elements 220a-d and for this purpose, the fixing can be designed according to the fixed elements 226a-d with a flexible rod.

FIG. 5 shows the device 300 in a longitudinal section. A respective adapter 206a-d is fixed with a movable valve rod 204a-d and can be moved along an actuation axis Sa-d that runs parallel to the mounting axis A via the assigned valve drive 204a-d. The adapter 206a-d provides, in the first state Z1, an installation space for installing the coupling section 116a-d. After achieving the state Z2, the installation space is closed and the coupling section 116a-d is fixed in a holding space, and thus with the drive rod 116a-d. The adapter 206a-d limits the travel of the diaphragm along the actuation axis.

An intermediate body 208a-d comprises control sections 212a-d, which are arranged within a through-opening of the intermediate body 208a-d fixedly. The adapter 206a-d arranged movably at least in sections in the through-opening is equipped with two adapter elements, which are fixed pivotably to the adapter 206a-d at a rotation axis running perpendicular to the actuation axis Sa-d. A spring element tensions the two adapter elements in such a way that the connection contours of the adapter elements pointing towards the actuation axis limit the valve diaphragm 114 a-d in the first position of the adapter 206a-d along the actuation axis S-ad and the common holding space for holding the coupling section 116a-d.

A contact section of the respective adapter element contacts, in a first position of the adapter 206a-d on the actuation axis Sa-d, which is taken in the first state Z1, the assigned control section 212a-d, and in such a way, that the respective adapter element is rotated at the rotation axis in an installation position. In the installation position, the connecting contours of the adapter elements restrict an installation space, which is bigger than a holding space. The connection contours of the adapter elements facing the actuation axis Sa-d limit, in a second position of the Adapter 206a-d, which is taken after achieving the second state Z2, the common holding space for holding and fixing the coupling section 116*a-d* to the assigned valve rod 204*a-d*.

Figure 6:
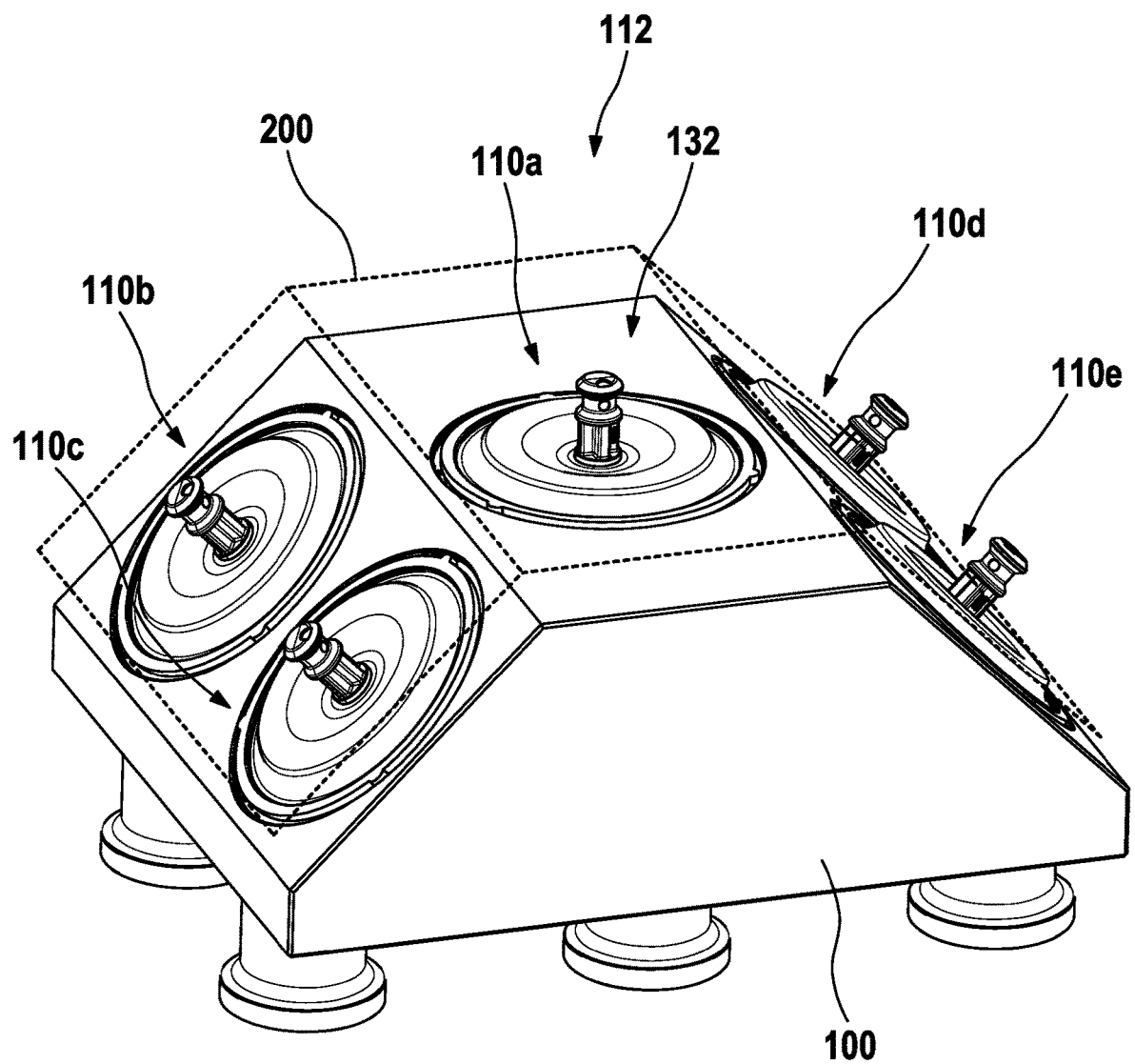
FIG. 6 depicts another embodiment of the valve block body.

FIG. 6 shows another example for the valve block body 100. Differing from the preceding figures, the valve block body 100 comprises drive connection sections 110*a-e* on the one side 112, which are oriented in different directions. Multiple surfaces inclined to each other arise as a result on the one side 112 of the valve block body 100. The valve block body 100 shown offers advantages due to shorter process fluid ducts and the arrangement of the fluid connections on the side opposite to the drive connection sections 110*a-e*. The drive mount 200 is marked schematically and follows the surface geometry of the valve block body 100.

Figure 7A:
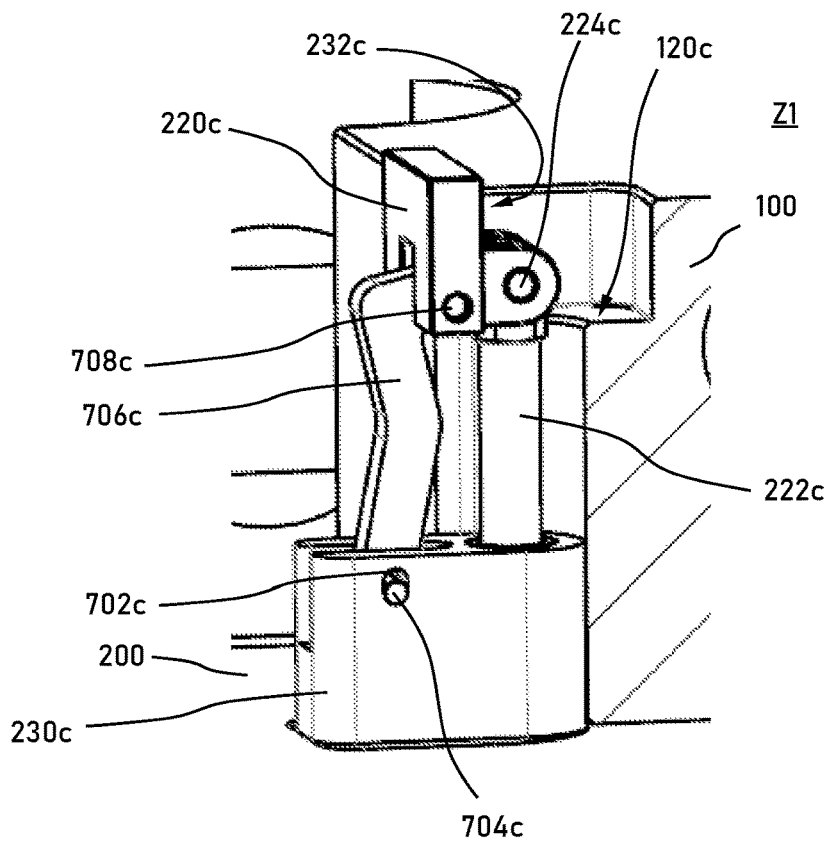
FIGS. 7A and 7B depict in a perspectival detailed view, the device in an alternative embodiment.
Figure 7B:
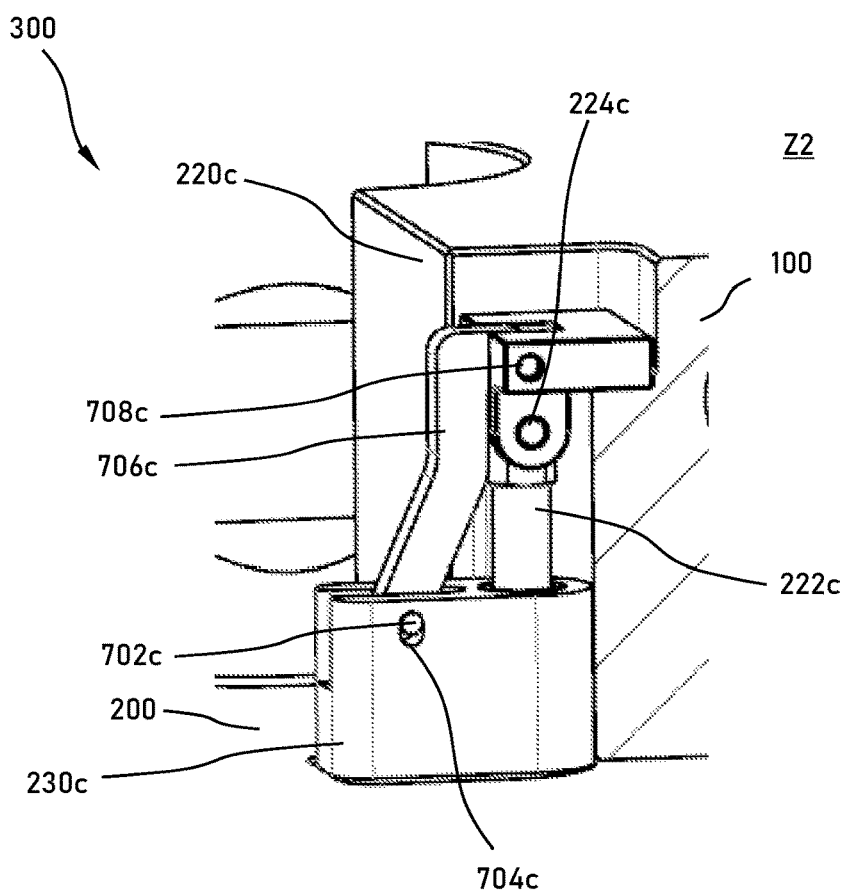

FIGS. 7A and 7B show, in a perspective detailed view, the device 300 in each of the states Z1 and Z2. An alternative embodiment is described with the help of the clamping element 220*c*. The other clamping elements are designed analogous to the clamping element 220*c*. The actuating rod 222*c* positioned movably along its longitudinal axis is connected in a fixed way to the control beam. The actuating rod 222*c* is connected with the assigned multiple clamping elements 220*c* via the swivel joint 224*c*. The form-fit element 230*c* is fixed with the drive mount 200. In the form-fit element 230*c*, two elongated holes are arranged which extend parallel to the actuation axis, from which the visible is provided with the reference number 702*c*. In the fixed elongated holes, protrusions of a rod 706*c* engage, wherein the visible protrusion is shown with the reference number 704*c*. The clamping element 220*c* is connected with the rod 706*c* via another swivel joint 708*c*. Therefore, the clamping element 220*c* designed as bracket is titled by an axial stroke parallel to the mounting axis A, as it is moved by the tension at the swivel joint 224*c* and tilted by the swivel joints 224*c* and 708*c* in the direction of the surface 120*c*. The rod 706*c* is supported by the protrusions at the drive mount 200. A flat contour of the rod 706*c* facing inwards lies in the second state Z2 at the actuating rod 222*c*.

After tilting, the clamping force is exercised on the multi-valve block 100 by the remaining axial stroke of the actuating rod 222*c*. A connection is established between the drive mount 200 and the valve block body 100 with the brackets. The clamping force brought in presses the valve block body 100 on the drive mount and thus presses the peripheral areas of the diaphragms of the valve block body 100 on the assigned sealing ring or the assigned sealing section of the drive mount. The actuating rods of the brackets or clamping elements 220*a-d* are moved axially by the axial displacement of the control beam.

The invention claimed is:

1. A device for arranging a valve block body on a drive mount comprising:
    the valve block body, including:
        a plurality of process fluid ducts, between which valve seats are arranged;
        a plurality of drive connection sections assigned to the valve seats, which are arranged on at least one side of the valve block body; and
        a plurality of clamping sections, which are arranged facing away from at least one side of the valve block body; and
    the drive mount, on which a plurality of valve drives are arranged, wherein in a first state (Z1), a plurality of movable clamping elements supported by the drive mount create an installation space (M) for arranging the valve block body on the drive mount, and wherein in a second state (Z2), the plurality of clamping elements engage the assigned clamping sections of the valve body and brace the valve block body between the plurality of clamping elements and the drive mount.

2. The device according to claim 1, wherein a plurality of form-fit elements protrude from the drive mount, wherein the plurality of form-fit elements, in the first state (Z1), limit the installation space (M) for the valve block body at least in sections, and wherein the plurality of form-fit elements in the second state (Z2) engage in the form-fit sections of the valve block body.

3. The device according to claim 2, wherein in the first state (Z1), the plurality of clamping elements lie at least in one area facing the valve body within an extension of the assigned form-fit element running parallel to the mounting axis (A).

4. The device according to claim 1, comprising at least one clamping drive for moving at least one of the plurality of clamping elements, wherein the at least one clamping drive is supported by the drive mount and wherein the at least one clamping drive is manual, pneumatic or motorized.

5. The device according to claim 4, wherein the plurality of clamping elements are coupled with each other via a common control beam, and wherein the at least one clamping drive induces its drive torque into the control beam.

6. The device according to claim 5, wherein the drive mount is arranged between the control beam on one side, and the at least one clamping drive and the clamping elements on the other side.

7. The device according to claim 1, wherein a movable actuating rod positioned along its longitudinal axis is connected with an assigned clamping element of the plurality of clamping elements via a swivel joint, wherein an element fixed to the drive mount engages in an elongated hole of the assigned clamping element.

8. The device according to claim 7, wherein the elongated hole tapers in the direction of a contact section of the assigned clamping element, which is arranged for engaging in the assigned clamping section of the valve block body.

9. The device according to claim 1, wherein a respective adapter of the plurality of valve drives, rigidly connected to a valve rod movable along an actuation axis, in the first state (Z1) provides an installation space for arranging an associated coupling section, and wherein the respective adapter defines the associated coupling section to the drive rod after reaching the second state (Z2).

10. The device according to claim 9, wherein each of the valve drives comprises:
    an intermediate body with control sections, which are fixed within a through-opening of the intermediate body; and
    the adapter arranged at least in sections and movably within the through-opening with adapter elements, which are movable at a rotation axis running perpendicular to the actuation axis, wherein a respective contact section of a respective one of the adapter elements in a first position of the adapter on the actuation axis, the first position is assumed in the first state (Z1), contacts the assigned control section such that the respective adapter element is rotated about the rotation axis to an installation position, in which connection contours of the adapter elements limit the installation space which is bigger than a holding space, wherein the connection contours of the adapter elements facing the actuation axis in a second position of the adapter, which is taken in after reaching the second state ($Z2$), limit the common holding space for holding and fixing the coupling section to the assigned valve rod to the actuation axis.

\* \* \* \* \*